(12) United States Patent
Suzuki

(10) Patent No.: US 10,202,954 B2
(45) Date of Patent: Feb. 12, 2019

(54) END SEAL STRUCTURE OF FUEL RAIL FOR GASOLINE DIRECT INJECTION ENGINE

(71) Applicant: USUI CO., LTD., Shimizu-cho, Sunto-gun, Shizuoka (JP)

(72) Inventor: Shuji Suzuki, Shimizu-cho (JP)

(73) Assignee: USUI CO., LTD. (JP)

( * ) Notice: Subject to any disclaimer, the term of this patent is extended or adjusted under 35 U.S.C. 154(b) by 0 days.

(21) Appl. No.: 15/568,933

(22) PCT Filed: Apr. 18, 2016

(86) PCT No.: PCT/JP2016/062268
§ 371 (c)(1),
(2) Date: Oct. 24, 2017

(87) PCT Pub. No.: WO2016/175077
PCT Pub. Date: Nov. 3, 2016

(65) Prior Publication Data
US 2018/0119657 A1    May 3, 2018

(30) Foreign Application Priority Data
Apr. 27, 2015    (JP) ................. 2015-090651

(51) Int. Cl.
*F02M 69/46*    (2006.01)
*F02M 55/02*    (2006.01)

(52) U.S. Cl.
CPC .......... *F02M 55/025* (2013.01); *F02M 55/02* (2013.01); *F02M 2200/16* (2013.01)

(58) Field of Classification Search
CPC ............... F02M 55/025; F02M 69/465; F02M 63/0275; F02M 2200/16
(Continued)

(56) References Cited

U.S. PATENT DOCUMENTS 2,625,955 A * 1/1953 Day .................... F16L 55/1152
138/89
5,370,252 A * 12/1994 Parsons ............... B01L 3/50825
215/247

(Continued)

FOREIGN PATENT DOCUMENTS

JP    2005-146976    6/2005
JP    2007-56819     3/2007
(Continued)

OTHER PUBLICATIONS

International Search Report dated May 17, 2016.

*Primary Examiner* — Hai Huynh
(74) *Attorney, Agent, or Firm* — Gerald E. Hespos; Michael J. Porco; Matthew T. Hespos

(57) ABSTRACT

Provided is an end seal structure of a fuel rail for a gasoline direct injection engine that has a simple structure and allows an end cap part to meet higher pressure requirements in a fuel rail having the structure in which one end or both ends of a rail body composed of a tubular member, such as a pipe, is/are closed by an end cap or end caps. The end seal structure employs a thread fastening method using the end cap and a collar brazed at the opening end of the fuel rail body and a gasket sealing method as a sealing method, wherein a gasket interposed between the end cap and the fuel rail body is tightened by an axial force generated due to tightening of the end cap that is screwed and fastened to the fuel rail body so as to be sealed.

7 Claims, 2 Drawing Sheets

(58) Field of Classification Search
USPC .......................................................... 123/456
See application file for complete search history.

(56) References Cited

U.S. PATENT DOCUMENTS

| | | | | |
|---|---|---|---|---|
| 6,135,156 | A * | 10/2000 | Donoho | F16L 55/1152 138/109 |
| 6,148,797 | A * | 11/2000 | Gmelin | F02M 55/025 123/456 |
| 6,321,719 | B1 * | 11/2001 | Schwegler | F02M 55/04 123/456 |
| 6,520,155 | B1 * | 2/2003 | Boecking | F02M 55/025 123/456 |
| 7,597,117 | B1 * | 10/2009 | Groso | F16L 55/1108 138/89 |
| 8,001,995 | B2 * | 8/2011 | Molloy | F01M 11/0408 138/89 |
| 2005/0235963 | A1 * | 10/2005 | Kilgore | F02M 55/025 123/456 |
| 2011/0023831 | A1 * | 2/2011 | Klesse | F02M 55/025 123/447 |
| 2011/0108005 | A1 | 5/2011 | Nishizawa et al. | |
| 2016/0341167 | A1 * | 11/2016 | Zdroik | F02M 55/025 |
| 2017/0122277 | A1 * | 5/2017 | Suzuki | F02M 55/025 |
| 2017/0122278 | A1 * | 5/2017 | Asahi | F02M 55/005 |
| 2017/0159626 | A1 * | 6/2017 | Asahi | F02M 55/005 |

FOREIGN PATENT DOCUMENTS

| | | |
|---|---|---|
| JP | 2008-297947 | 12/2008 |
| JP | 2010-7651 | 1/2010 |
| JP | 2011-144768 | 7/2011 |
| JP | 2012-177395 | 9/2012 |

* cited by examiner

END SEAL STRUCTURE OF FUEL RAIL FOR GASOLINE DIRECT INJECTION ENGINE

BACKGROUND

Field of the Invention

The present invention relates to an end seal structure of a fuel rail (delivery pipe) for supplying a high-pressure fuel, which is supplied from a fuel booster pump of an electronic fuel injection-type automobile engine or the like, through a fuel injector (an injection nozzle) for directly injecting the fuel into an engine cylinder. More specifically, the present invention relates to an end seal structure of a fuel rail for a gasoline direct injection engine structured to directly supply the fuel from the rail to the injector with an injection pressure on the order of 20 to 100 MPa.

Description of the Related Art

Some exemplary fuel rails can be mentioned as conventional fuel rails for gasoline direct injection engines of this type. For example, an exemplary fuel rail includes a main pipe and a plurality of branch pipes and is structured such that through-holes for receiving each branch pipe are formed in an outer wall of the main pipe, each through-hole having an annular wall that projects toward the outside and inside of the main pipe, respectively, and each branch pipe being fixed to the annular wall. Another exemplary fuel rail is structured such that a branch pipe is connected to a body, which is an accumulating vessel, directly or via a branch joint fitting (nipple). Yet another exemplary fuel rail is structured such that a socket for connection of an injector is directly attached to a rail body composed of a tubular member such as a pipe.

Further, other exemplary fuel rails may be mentioned as the fuel rail structured such that the socket for connection of the injector is directly attached to the rail body composed of a tubular member such as a pipe. For example, an exemplary fuel rail includes an injector holder and a fastening bracket that are directly attached to a rail body composed of a tubular member such as a pipe into which pressurized fuel is supplied from a high-pressure fuel pump (see Japanese Patent Laid-Open No. 2010-7651). Also, a high-pressure fuel delivery pipe for a direct injection engine includes a cylindrical body pipe into which pressurized fuel is supplied from a high-pressure fuel pump, a plurality of sockets to which fuel injection valves coupled to the body pipe and operable to be opened and closed by a control unit are coupled, and a plurality of mounting stays integrally fastened to the body pipe so as to attach the body pipe to the engine (see Japanese Patent Laid-Open No. 2011-144768).

However, the above-mentioned conventional fuel rails for gasoline direct injection engines have the following problems.

That is, in the above-mentioned various conventional fuel rails for gasoline direct injection engines, a rail body composed of a tubular member such as a pipe is structured such that one end or both ends thereof are closed, and its end rail structure is, for example, as illustrated in FIGS. 2 and 3 as enlarged views, generally structured such that end caps 112A and 112B are joined by brazing to corresponding one of the ends of the openings of a cylindrical body pipe 111.

Meanwhile, a problem that is identified and should be addressed is the strength of the end caps 112A and 112B closing the both ends of the body pipe 111 in the trends of higher pressures in gasoline direct injection systems. Specifically, the following and other problems are identified. In the case of the end seal structure structured by joining the end caps 112A and 112B by brazing to the body pipe 111 as illustrated in FIGS. 2 and 3, the end seal structure is structured such that, when an internal pressure is applied in the body pipe 111 which is the rail body, a force generated when the body pipe 111 is deformed in the radial direction (swelling toward the outside of the tubular member) is received by brazed parts 113A and 113B, respectively, so that these brazed parts 113A and 113B become the weakest parts in terms of their strength. This makes it difficult for gasoline direct injection systems to meet their higher-pressure requirements.

Further, since the brazed parts 113A and 113B are in direct contact with the fuel (pressure medium), if there is any unevenness in the shape of these brazed parts, then it tends to become a factor of breakage of the brazed parts due to the concentration of stress.

SUMMARY

The present invention has been made in view of the problems in the conventional fuel rails, and an object of the present invention is to provide an end seal structure of a fuel rail for a gasoline direct injection engine, in particular in a fuel rail having a structure in which one end or both ends of the rail body composed of a tubular member, such as a pipe, is/are closed by an end cap or end caps, having a simple structure and allowing the end cap part to meet higher pressure requirements.

An end seal structure of a fuel rail for a gasoline direct injection engine according to the present invention employs a brazing method using a collar and a thread fastening method, in place of the conventional brazing method that directly brazes the end cap to the rail body, and has the structure in which a brazed part that couples a rail body and a collar receives, as a compressive stress, a force generated in the radial direction of the rail body when an internal pressure is applied to the rail body, and a gasket is used as sealing means and a thread fastening part is not in contact with a fuel (pressure medium). In sum, the end seal structure of a fuel rail for a gasoline direct injection engine according to the present invention has a structure in which one end or both ends of a fuel rail body which is composed of a tubular member is/are closed by an end cap or end caps with a thread fastening method, the end seal structure including: a collar brazed at an outer circumference of an opening end of the fuel rail body in such a manner that a thread fastening part, which is provided in a part of an inner peripheral wall surface of the collar, projects from the opening end; a convex end cap to be screwed together with the thread fastening part of the collar; and a gasket that is made of metal and interposed between the convex end cap and the fuel rail body. The gasket is tightened by an axial force generated due to tightening of the convex end cap so as to seal the opening end of the fuel rail body.

Further, according to the present invention, a preferable aspect of the end seal structure of the fuel rail for the gasoline direct injection engine having the structure described above is that the fuel rail body and the convex end cap are made of stainless steel, or a surface treatment material obtained by performing a surface treatment using Ni or a Ni-based alloy on various steel products, and the gasket is made of copper or brass, or a surface treatment material obtained by performing a surface treatment, such as plating, on these materials.

In the end seal structure of the fuel rail for the gasoline direct injection engine according to the present invention, as a method of attaching the end cap to the rail body, a thread fastening method using the convex end cap and the collar brazed at the outer circumference of the opening end of the fuel rail body is employed; a gasket sealing method is employed as a sealing method; the gasket made of metal is tightened and sealed by an axial force generated due to tightening of the convex end cap that is screwed and fastened to the rail body; and the brazed part that couples the fuel rail body and the collar receives, as a compressive stress, a force generated when the rail body is deformed (swelling toward the outside of the tubular member) in the radial direction under application of an internal pressure to the rail body. With this structure, the brazed part that couples the fuel rail body and the collar becomes advantageous in terms of resistance to fatigue failure and allows to sufficiently meet the higher pressure requirements of a system. Further, according to the present invention, the employment of the thread fastening method through the collar that couples the fuel rail body and the end cap eliminates the need for performing thread processing on the fuel rail body and thus minimizes the required thickness of the fuel rail body.

In addition, with the structure in which the brazed part is not in contact with the fuel (pressure medium), even when any unevenness exists in the shape of the brazed part, it does not act as a cause of breakage due to the concentration of stress. Further, since the gasket sealing method is employed, an advantageous effect of ensuring the stability and reliability of the seal at the end of the rail body can be obtained.

Furthermore, the following advantageous effects can be also obtained. That is, when the fuel rail body and the convex end cap are made of stainless steel, or a surface treatment material obtained by performing a surface treatment using Ni or a Ni-based alloy on various steel products, the corrosion resistance and pressure resistance are increased, and when the gasket is made of copper or brass, or a surface treatment material obtained by performing a surface treatment, such as plating, on these materials, the sealing properties and corrosion resistance are enhanced.

Note that when other components (such as an injector socket and a bracket) are brazed to the fuel rail body and the both ends of the fuel rail body are brought into an open state, substitution of the atmosphere gas in the fuel rail body proceeds smoothly in a brazing furnace, thereby providing an advantageous effect of achieving an excellent brazing quality.

DETAILED DESCRIPTION

An end seal structure of a fuel rail for a gasoline direct injection engine according to the present invention will be described with reference to the drawings.

In the fuel rail for the gasoline direct injection engine according to the present invention, a fuel inlet pipe (not illustrated) is connected to one end or a pipe wall surface of the fuel rail. The fuel inlet pipe is connected to a fuel tank (not illustrated) via a piping (not illustrated), and a fuel in the fuel tank is transferred to the fuel inlet pipe through the piping and the fuel pump, made to flow from the fuel inlet pipe to the main pipe rail, and is then injected from an injector (not illustrated) into a cylinder (not illustrated).

The main pipe rail is a rail body for a gasoline direct injection engine and includes a plurality of sockets (not illustrated) and the like that are formed at its circumferential wall part and allow the injector to be connected thereto. For example, a four-cylinder engine and an in-line six-cylinder engine are provided with four sockets and six sockets, respectively, which are provided at desired intervals.

Figure 1:
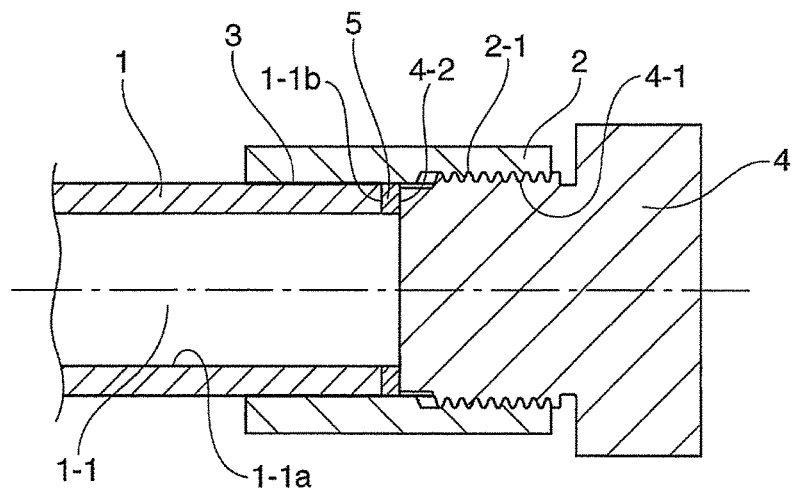
FIG. 1 is a cross-sectional view illustrating an embodiment of an end seal structure of a fuel rail for a gasoline direct injection engine according to the present invention.
Figure 2:
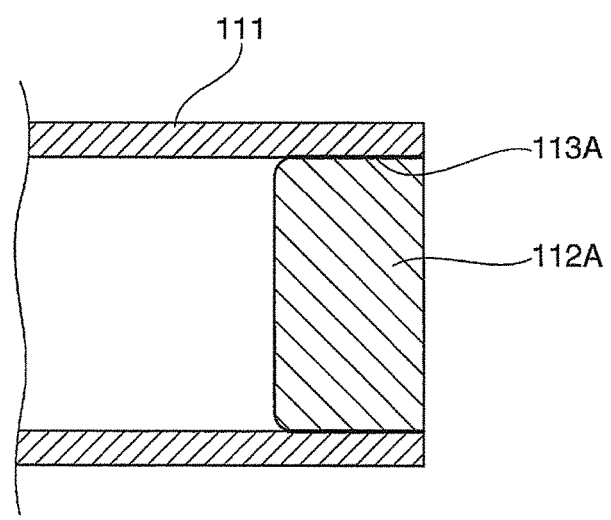
FIG. 2 is a cross-sectional view illustrating an example of a conventional end seal structure of a fuel rail for a gasoline direct injection engine.
Figure 3:
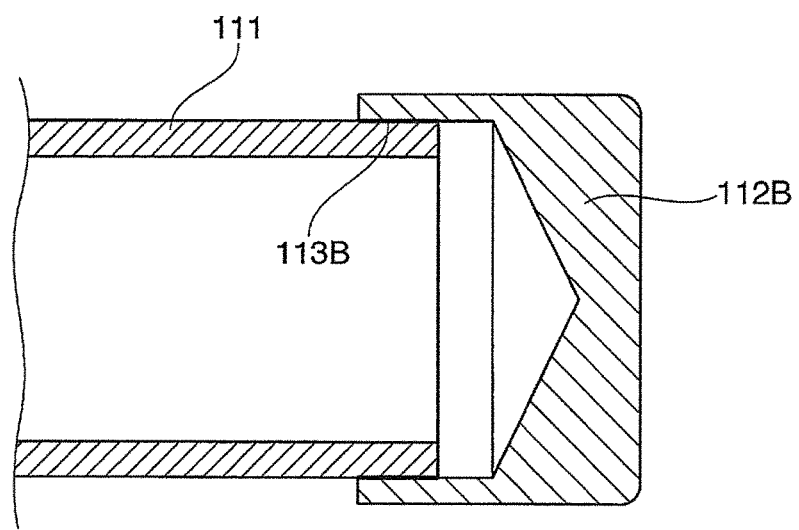
FIG. 3 is a cross-sectional view illustrating another example of a conventional end seal structure of a fuel rail for a gasoline direct injection engine.

FIG. 1 shows the cross-sectional view illustrating the embodiment of the end seal structure of the fuel rail for the gasoline direct injection engine according to the present invention. Referring to FIG. 1, reference numeral 1 denotes a fuel rail body; 1-1, a flow passage; 1-1a, an inner peripheral wall surface; 1-1b, an end-cap-side opening end face (pressure receiving surface); 2, a collar; 2-1, a thread fastening part; 3, a brazed part that couples the fuel rail body 1 and the collar 2; 4, a convex end cap; 4-1, a thread fastening part to be screwed together with the thread fastening part 2-1 provided on the collar 2; 4-2, a pressing surface provided on a surface of the convex end cap, facing the opening end face of the fuel rail body; and 5, a gasket.

Specifically, the end seal structure of the fuel rail for the gasoline direct injection engine according to the embodiment illustrated in FIG. 1 includes: the collar 2 brazed at the outer circumference of the pipe end of the fuel rail body 1 including the flow passage 1-1 and the cylindrical inner peripheral wall surface 1-1a in such a manner that the thread fastening part projects from the pipe end; the convex end cap 4 to be screwed and attached to the thread fastening part of the collar 2; and the gasket 5 that is made of metal and interposed between the opening end of the fuel rail body 1 and the convex end cap 4. The collar 2 is provided with the thread fastening part 2-1 to be screwed together with the thread fastening part 4-1 of the convex end cap 4 in a part of the inner wall surface thereof. Areas other than the projecting part are brazed by the brazed part 3 at the outer circumference of the opening end of the fuel rail body 1 so that the part provided with the thread fastening part 2-1 projects from the opening end of the fuel rail body 1. Further, the gasket 5 is interposed between the opening end face 1-1b of the fuel rail body 1 and the pressing surface 4-2 of the convex end cap 4 that faces the opening end face 1-1b.

In this regard, the fuel rail body 1 and the convex end cap 4 are preferably made of stainless steel or a surface treatment material that is obtained by performing a surface treatment using Ni or a Ni-based alloy on various steel products, such as low-carbon steel, in view of corrosion resistance and pressure resistance. Further, the gasket 5 is preferably made of copper or brass, or a surface treatment material that is obtained by performing a surface treatment, such as plating, on these materials, in view of sealing properties and corrosion resistance.

In the end seal structure of the fuel rail for the gasoline direct injection engine having the structure described above, when an end of the fuel rail body 1 is sealed, the gasket 5 is fitted into the collar 2; the thread fastening part 4-1 of the convex end cap 4 is screwed into the thread fastening part 2-1 of the collar 2; and the convex end cap 4 is tightened in a state where the gasket 5 is brought into contact with the opening end face (pressure receiving surface) 1-1b of the fuel rail body 1. At this time, the gasket 5 is tightened and sealed by an axial force generate due to tightening of the convex end cap 4.

Specifically, in the end seal structure of the fuel rail for the gasoline direct injection engine having the structure described above, the gasket 5 interposed between the opening end face (pressure receiving surface) 1-1b of the fuel rail body 1 and the pressing surface 4-2 located closer to the convex end cap 4 is tightened by an axial force generated due to tightening of the convex end cap 4, which is screwed and attached to the collar 2 fixed by brazing to the opening end of the fuel rail body 1. With this structure, the opening end of the fuel rail body 1 is sealed, and the flow passage 1-1 of the fuel rail body 1, the brazed part 3, and the thread fastening parts 2-1 and 4-1 are completely blocked.

Accordingly, in the case of the end seal structure of the fuel rail for the gasoline direct injection engine, the brazed part 3 that couples the fuel rail body 1 and the collar 2 is the area on which a force (compressive stress) against deformation (swelling toward the outside of the tubular member) in the radial direction of the fuel rail body 1 that is generated under application of an internal pressure to the flow passage 1-1 of the fuel rail body 1 acts. Consequently, an excellent fatigue resistance characteristic can be provided and higher pressure requirements for the internal pressure to be applied to the flow passage 1-1 of the fuel rail body 1 can be met.

Further, since the brazed part 3 that couples the fuel rail body 1 and the collar 2 is not in contact with the fuel (pressure medium) in the fuel rail body 1 due to the action of the gasket 5. Therefore, even when any unevenness exists in the shape of the brazed part, it does not act as a cause of breakage due to the concentration of stress. Furthermore, since a metal seal method is employed in which the gasket 5 is brought into pressure contact with the opening end face (pressure receiving surface) 1-1b of the fuel rail body 1 by an axial force generated due to tightening of the convex end cap 4, the stability and reliability of the seal at the end of the fuel rail body 1 can be ensured.

Note that in the present invention, when the fuel rail body 1 and the convex end cap 4 are made of stainless steel, or a surface treatment material obtained by performing a surface treatment using Ni or a Ni-based alloy on various steel products, the corrosion resistance and pressure resistance are enhanced, which leads to an increase in lifetime. Further, when the gasket 5 is made of copper or brass, or a surface treatment material obtained by performing a surface treatment, such as plating, on these materials, the sealing properties and corrosion resistance are enhanced, thereby further ensuring the stability and reliability of the seal. While the above embodiments illustrate the metal seal method using a gasket as a sealing method, the seal material is not limited to one made of metal. Other materials can also be adopted, as a matter of course.

REFERENCE SIGNS LIST

1 Fuel rail body
1-1 Flow passage
1-1a Inner peripheral wall surface
1-1b Opening end face
2 Collar
2-1, 4-1 Thread fastening part
3 Brazed part
4 Convex end cap
4-2 Pressing surface
5 Gasket

The invention claimed is:

1. An end seal structure of a fuel rail for a gasoline direct injection engine, the fuel rail having a structure in which one end or both ends of a fuel rail body composed of a tubular member is/are closed by an end cap or end caps with a thread fastening method, the end seal structure comprising:
a collar brazed at an outer circumference of an opening end of the fuel rail body in such a manner that a thread fastening part provided in a part of an inner wall surface of the collar projects from the opening end;
a convex end cap to be screwed together with the thread fastening part of the collar; and
a gasket that is made of metal and interposed between the convex end cap and the fuel rail body,
wherein the gasket is tightened by an axial force generated due to tightening of the convex end cap so as to seal the opening end of the fuel rail body.

2. The end seal structure of the fuel rail for the gasoline direct injection engine according to claim 1, wherein the fuel rail body and the convex end cap are made of stainless steel, or a surface treatment material obtained by performing a surface treatment using Ni or a Ni-based alloy on various steel products.

3. The end seal structure of the fuel rail for the gasoline direct injection engine according to claim 2, wherein the gasket is made of copper or brass, or a surface treatment material obtained by performing a surface treatment, such as plating, on these materials.

4. The end seal structure of the fuel rail for the gasoline direct injection engine according to claim 1, wherein the gasket is made of copper or brass, or a surface treatment material obtained by performing a surface treatment, such as plating, on these materials.

5. An end seal structure of a fuel rail for a gasoline direct injection engine, comprising:
a fuel rail body having an axial end with an opening and an outer circumferential surface extending from the end;
a collar having opposite first and second longitudinal ends and an inner circumferential surface extending between the first and second longitudinal ends, areas of the inner circumferential surface adjacent the first longitudinal end being unthreaded and in surface contact with the outer circumferential surface of the fuel rail body adjacent the end of the fuel rail body, areas of the inner circumferential surface of the collar adjacent the second end of the collar having internal threads projecting axially beyond the end of the fuel rail body, the collar being brazed at the outer circumferential surface of the fuel rail body;
a convex end cap having an axial end and external threads extending from the axial end, the external threads of the end cap being threaded to the internal threads of the collar; and
a metal gasket interposed between the axial end of end cap and the axial end of the fuel rail body, the gasket being sealed to the inner circumferential surface of the collar, the axial end of the fuel rail body and the axial end of the end cap by an axial force generated by tightening of the convex end cap to the collar.

6. The end seal structure of the fuel rail for the gasoline direct injection engine of claim 5, wherein the fuel rail body and the convex end cap are made of stainless steel, or a surface treatment material obtained by performing a surface treatment using Ni or a Ni-based alloy on various steel products.

7. The end seal structure of the fuel rail for the gasoline direct injection engine of claim 6, wherein the gasket is made of copper or brass, or a surface treatment material obtained by performing a surface treatment on these materials.

\* \* \* \* \*